United States Patent [19]

Feldman et al.

[11] Patent Number: 4,939,744

[45] Date of Patent: Jul. 3, 1990

[54] METHOD AND APPARATUS FOR PRODUCING A PHOTOPUMPED VUV LASER IN Mo6+ ION-CONTAINING PLASMA

[75] Inventors: Uri Feldman, Columbia; Joseph Reader, Rockville, both of Md.

[73] Assignee: United States of America as represented by the Secretary of Commerce, Washington, D.C.

[21] Appl. No.: 436,839

[22] Filed: Nov. 15, 1989

[51] Int. Cl.⁵ .............................................. H01S 3/091
[52] U.S. Cl. .......................................... 372/76; 372/39
[58] Field of Search ............................. 372/76, 69, 39

[56] References Cited

U.S. PATENT DOCUMENTS

| | | |
|---|---|---|
| 3,493,845 | 2/1970 | Bramley . |
| 3,826,996 | 7/1974 | Jaegle et al. . |
| 4,132,962 | 1/1979 | Yang et al. . |
| 4,399,539 | 8/1983 | White . |
| 4,426,706 | 1/1984 | Liu et al. . |
| 4,592,056 | 5/1986 | Elton .................................. 372/69 |
| 4,592,064 | 5/1986 | Silfvast ............................... 372/76 |
| 4,704,718 | 11/1987 | Suckewer ........................... 372/76 |
| 4,704,718 | 11/1987 | Suckewer . |
| 4,736,381 | 4/1988 | Eden et al. . |
| 4,797,889 | 1/1989 | Lempicki . |
| 4,870,648 | 9/1989 | Ceglio et al. ...................... 372/5 |
| 4,910,436 | 3/1990 | Collins et al. ................. 315/111.21 |

OTHER PUBLICATIONS

Waynant et al., Proceedings of the IEEE, vol. 64, No. 7 (Jul. 1976), pp. 1059–1092.
Vinogradov et al., Sov. J. Quantum Electron, vol. 5, No. 1, 59 (1975).
Norton et al., J. Phys., B, vol. 8, No. 6, 989 (1975).
Dixon et al., J. Opt. Soc. Am., B, vol. 1, No. 2, 232 (1984).
Tauheed et al., J. Phys., B, vol. 17, 179 (1984).
Reader et al., J. Opt. Soc. Am., B, vol. 3, 874 (1986).
Reader et al., J. Opt. Soc. Am., vol. 62, No. 2, 273 (1972).
Cowan, The Theory of Atomic Structure and Spectra, University of California Press, Berkeley, CA (1981).
Feldman et al., Rev. Sci. Instrum., vol. 38, No. 10, 1372 (1967).
Cohen et al., J. Opt. Soc. Am., vol. 58, No. 6, 843 (1968).
Feldman et al., J. Opt. Soc. Am., B, vol. 6, No. 2, 264 (1989).

Primary Examiner—Léon Scott, Jr.
Attorney, Agent, or Firm—Thomas Zack; Alvin J. Englert; Holly D. Kozlowski

[57] ABSTRACT

A method and an apparatus for producing a photopumped VUV laser in an $Mo^{6+}$ ion-containing plasma comprise photopumping the $Mo^{6+}$ ion-containing plasma with radiation from $Mo^{11+}$ ions. In one embodiment, the $Mo^{6+}$ ion-containing plasma has an electron density of less than about $10^{18}$ cm$^{-3}$ and the $Mo^{11+}$ ions are contained in a plasma having an electron density greater than about $10^{20}$ cm$^{-3}$.

12 Claims, 2 Drawing Sheets

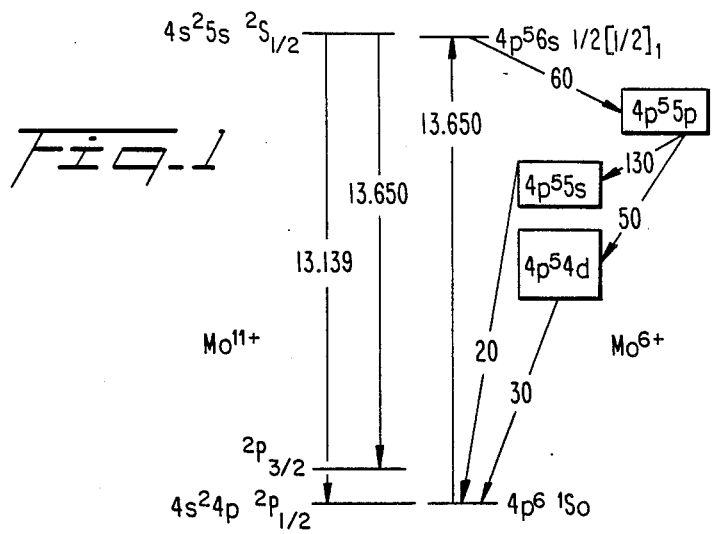
Fig. 1
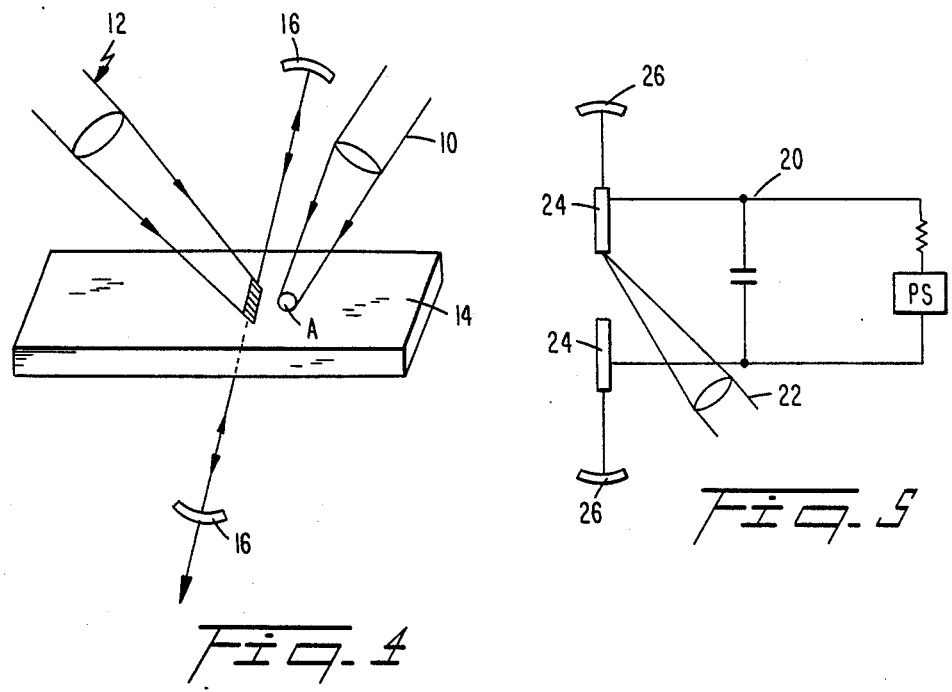
Fig. 4
Fig. 5

15 kV 5 kV

| 13.443 | 13.650 |
| Mo$^{12+}$ | Mo$^{6+}$ + Mo$^{11+}$ |

# 4,939,744

METHOD AND APPARATUS FOR PRODUCING A PHOTOPUMPED VUV LASER IN MO6+ ION-CONTAINING PLASMA

FIELD OF THE INVENTION

The present invention relates to a method and apparatus for producing a photopumped VUV laser in an $Mo^{6+}$ ion-containing plasma. The method and apparatus are based on the use of line radiation from $Mo^{11+}$ ions.

BACKGROUND OF THE INVENTION

Various methods and apparatus for producing lasers are known in the art. For example, the Lempicki U.S. Pat. No. 4,797,889 discloses a solid state laser in which molecules containing transition metal ions form the lasing medium. In one embodiment, a molecule containing molybdenum in combination with either oxygen or a halogen atom is employed and lasing occurs at 450 nm. The Yang et al. U.S. Pat. No. 4,132,962 discloses a solid state laser in which the lasing medium consists of neutral atoms in a crystal environment. The Liu et al. U.S. Pat. No. 4,426,706 discloses an excimer laser in which the discharge tube contains electrodes made of molybdenum. The lasing process is based on a rare-gas halide such as krypton fluoride. The Jaegle et al. U.S. Pat. No. 3,826,996 discloses a laser system employing a collisionally excited plasma in which the upper levels of the lasing transitions are populated by a recombination process. The plasma is formed by use of a laser focused onto a target material.

The Bramley U.S. Pat. No. 3,493,845 discloses a system in which microwave radiation is employed to excite a lasing gas medium comprising an atom with a metastable level as the lowest excited level. The microwave radiation is used to both pump the ion to its metastable level directly from its ground state and to quench other excited states of the atom so as to produce a population inversion. The lasing transitions of this system are those of a neutral atom. The White U.S. Pat. No. 4,399,539 discloses a system for producing lasing in singly ionized atoms by using autoionization of an alkaline earth atom to create a population of singly ionized atoms in a metastable state. The ion is further pumped from the metastable state to a higher state by a tuneable laser. The Eden et al., U.S. Pat. No. 4,736,381 discloses a system for producing lasing in various molecules in the visible region of the spectrum through photodissociation of metal halides. The Suckewer U.S. Pat. No. 4,704,718 discloses a system in which highly ionized atoms are photopumped to excited states by multiphoton excitation from the ground state provided by light from a fixed-frequency picosecond-type laser. The excited state is then lased to lower states. Additionally, a review of short wavelength laser research is provided by Waynant et al., *Proceedings of the IEEE*, Vol. 64, No. 7 (July 1976), pages 1059–1092.

The use of coincident line pairs for photoexcitation pumping of short wavelength lasers was first proposed by Vinogradov et al., *Sov. J. Quantum Electron*, Vol. 5, No. 1, 59 (1975) and by Norton et al., *J. Phys.*, B, Vol. 8, No. 6, 989 (1975). Generally, intense line radiation from one ion is used to selectively pump an upper level of another ion. A review of this method and a list of line matches for H-like, He-like, Li-like and other ions is provided by Dixon et al., *J. Opt. Soc. Am.*, B, Vol. 1, No. 2, 232 (1984).

However, many laser systems which are known are disadvantageous in that they require complex apparatus and operating procedures and/or are economically unfavorable.

SUMMARY OF THE INVENTION

Accordingly, it is an object of the present invention to provide a novel method and apparatus for producing a laser. It is an additional object of the present invention to provide a method and apparatus for producing a VUV laser having a wavelength less than about 1000 Angstroms. It is a further object of the invention to provide a method and apparatus for producing an inexpensive source of coherent radiation in the 60 nm region. It is an additional object of the invention to provide a method and apparatus for producing a photopumped laser while employing the wavelength coincidence of two ions of molybdenum.

These and additional objects are provided by the method and apparatus according to the present invention for producing a photopumped VUV laser in an $Mo^{6+}$ ion-containing plasma. The present method comprises photopumping the $Mo^{6+}$ ions with radiation from $Mo^{11+}$ ions. The produced laser is of a wavelength of approximately 60 nm. The $Mo^{6+}$ containing plasma has an electron density of less than about $10^{18}$ cm$^{-3}$ while the $Mo^{11+}$ ions are contained in a plasma having an electron density greater than about $10^{20}$ cm$^{-3}$. The apparatus for producing a photopumped VUV laser in an $Mo^{6+}$ ion-containing plasma according to the present invention comprises a means for generating an $Mo^{6+}$ ion-containing plasma and means for generating an $Mo^{11+}$ ion-containing plasma sufficiently near the $Mo^{6+}$ ion-containing plasma to allow radiation from the $Mo^{11+}$ ion-containing plasma to photopump the $Mo^{6+}$ ions. The method and apparatus according to the present invention are particularly advantageous since both ions employed in the photopumped laser belong to the same element, i.e., molybdenum.

These and additional objects and advantages will be more fully understood in view of the following detailed description.

BRIEF DESCRIPTION OF THE DRAWING

The following detailed description will be more fully understood when viewed together with the drawing in which:

FIG. 1 represents a level diagram showing the origin of pertinent lines in the $Mo^{6+}$ and $Mo^{11+}$ ions with wavelengths given in nm;

FIG. 4 is a schematic diagram of a first embodiment of the apparatus according to the present invention; and FIG. 5 is a schematic diagram of a second embodiment of the apparatus according to the present invention.

DETAILED DESCRIPTION

The method and apparatus for producing a photopumped VUV laser in an $Mo^{6+}$ ion-containing plasma according to the present invention comprises photopumping the $Mo^{6+}$ ions with radiation from $Mo^{11+}$ ions. The present method and apparatus are based on the wavelength coincidence for the $Mo^{6+}$ and $Mo^{11+}$ ions at approximately 13.650 nm, Feldman and Reader, *J. Opt. Soc. Am.*, B, Vol. 6, No. 2, 264 (1989).

Generally, for resonance photoexcitation to be an effective pumping method, several conditions must be satisfied. That is, the profiles of the pumping and absorbing transitions must overlap significantly, the pumping transition should be a strong line, the absorbing transition should originate on the ground state and have a large oscillator strength, and the pumped level must decay to a lower level that decays at a much higher rate. The pumping radiation for the present scheme is the $4s^24p^2P_{3/2}-4s^25s^2S_{\frac{1}{2}}$ transition of the gallium-like ion $Mo^{11+}$ at 13.6499(5) nm while the absorbing transition is the $4s^24p^6\ ^1S_0-4o^56s\ \frac{1}{2}[\frac{1}{2}]_1$ line of the krypton-like ion $Mo^{6+}$ at 13.6507(3) nm. These transitions are further described by Reader et al, *J. Opt. Soc. Am.*, B, Vol. 3, 874 (1986) and Vol. 62, No. 2, 273 (1972). FIG. 1 shows the origins of the two lines in the ions. When excited to a $4s^24p^56s$ level, the $Mo^{6+}$ ion will decay to levels of $4s^24p^55p$, which in turn will decay rapidly to levels of $4s^24p^54d$ and $4s^24p^55s$. A population inversion between the $4s^24p^56s$ and the $4s^24p^55p$ levels can thus be produced.

From the reported wavelengths of the $Mo^{6+}$ and $Mo^+$ transitions, it is not obvious whether a useful coincidence of these two transitions actually exists. However, the effect of Doppler broadening improves the situation. If the plasmas in which the two lines originate are optically thin, the line widths will be given by the Doppler formula $$\Delta\lambda = 2(\ln 2)^{\frac{1}{2}}(2kT_i/M)^{\frac{1}{2}}\lambda/c$$

where $\Delta\lambda$ is the full width at half maximum, $\lambda$ is the wavelength, c is the speed of light in vacuum, ks is the Boltzmann constant, $T_i$ is the ion temperature, and M is the atomic mass. If an ion temperature $T_i$ for each ion of 50% its ionization energy is assumed, that is 50% of 126 eV[5] for $Mo^{6+}$ and 50% of 230 eV[4] for $Mo^{11+}$, the line widths will be 0.0008 nm for $Mo^{6+}$ and 0.0011 nm for $Mo^{11+}$. *Therefore, although the possible overlap of the two line profiles is increased by taking account of the Doppler widths, the existence of a useful coincidence is still not conclusively established.*

Figure 2:
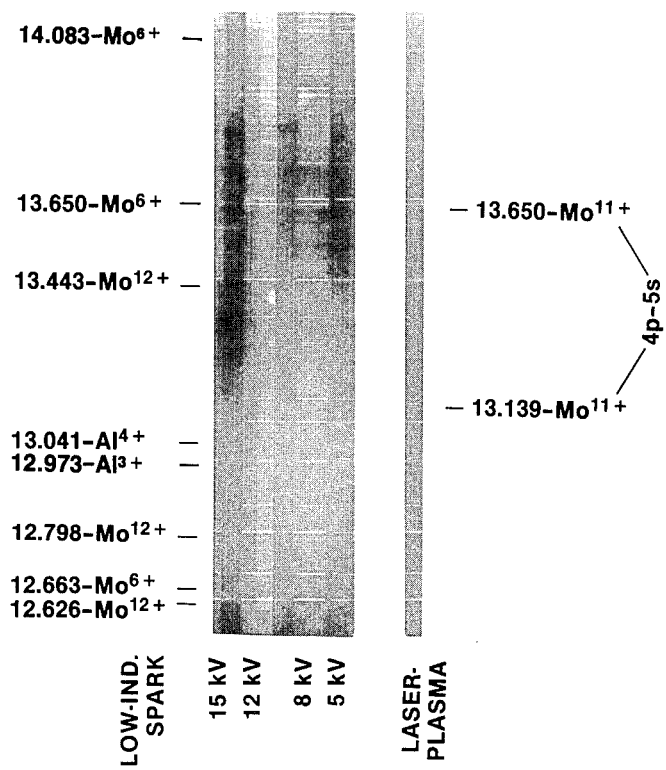
FIG. 2 is the spectra of Mo generated by low-inductance sparks and a laser-produced plasma with wavelengths given in nm.

That a good coincidence does in fact exist is shown by the spectra set forth in FIG. 2. In these spectra, the emission lines are white on the black background. The lowest spectrum labelled Laser-Plasma was obtained by focusing light from an Nd/glass laser onto a flat molybdenum target. The resulting plasma contained only a small number of stages of ionization. Thus, the 13.139 and 13.650-nm lines of $Mo^{11+}$ are present, while the 12.663 and 14.083-nm lines of $Mo^{6+}$ are absent.

The 13.139 ($\lambda_1$) and 13.650-nm ($\lambda_2$) lines of $Mo^{11+}$ represent the transitions $4s^24p\ ^2P_{\frac{1}{2}}-4s^25s\ ^2S_{\frac{1}{2}}$ and $4s^24p\ ^2P_{3/2}-4s^25s\ ^2S_{\frac{1}{2}}$, respectively. They thus have the same upper level and their intensities, I, in optically thin plasmas should be proportional to their spontaneous decay rates, A. That is $$\frac{I_2}{I_1} = \frac{A_2}{A_1} = \frac{8.3 \times 10^{10}\ \text{sec}^{-1}}{3.9 \times 10^{10}\ \text{sec}^{-1}} = 2.1$$

which corresponds with analytical observations. The decay rates employed are calculated with the Hartree-Fock computer code of Cowan, *The Theory of Atomic Structure and Spectra*, University of California Press, Berkeley, Calif., (1981), p. 214–215.

The upper four spectra in FIG. 2 were obtained from a low-inductance vacuum spark as described by Feldman et al, *Rev. Sci. Instrum.*, Vol. 38, No. 10, 1372 (1967). This spark can produce keV-type plasmas in very small, very hot regions as described by Cohen et al, *J. Opt. Soc. Am.*, Vol. 58, No. 6, 843 (1968). Other regions exist in the spark that are much cooler. It is evident that such a cool region exists in the spark from the absorption lines seen in the spectra taken at 12 and 15 kV. Clearly, these lines are the result of absorption of the continuum produced in the hot central core of the spark by atomic ions in a cool outer region.

Figure 3:
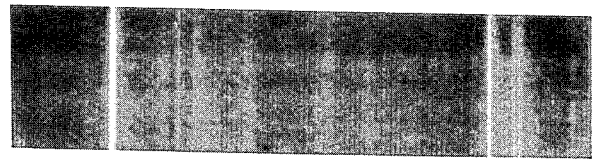
FIG. 3 is an enlarged view of the 15 kV spectrum shown in FIG. 2.
Figure 3:
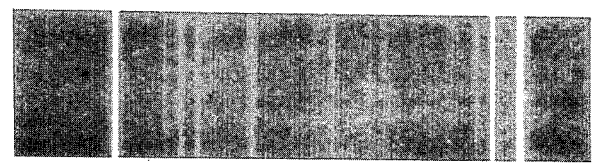

In the 15 kV spectrum, the 13.139-nm line of $Mo^{11+}$ is strong and has a normal appearance. However, the central core of the 13.650 nm line of $Mo^{11+}$ is missing. An enlarged view of this spectrum is shown in FIG. 3. The apparent reversal of the 13.650 nm line of $Mo^{11+}$ is almost certainly due to absorption by $Mo^{6+}$ ions in the cool outer region. Therefore, the 13.650 nm lines of $Mo^{6+}$ and $Mo^{11+}$ closely coincide. That this effect is not due to self absorption can be seen from the following calculation. The ratio R of the opacities of thin plasmas for these two lines is given by the formula $$R = \frac{\tau_2}{\tau_1} = \frac{f_2\ \lambda_2^2\ \Delta\lambda_1\ N_2}{f_1\ \lambda_1^2\ \Delta\lambda_2\ N_1}$$

where f is the oscillator strength of the lines and N is the population of the lower level of the transition. In thin plasmas, the line width is mostly due to Doppler broadening, and $\Delta\lambda$ is proportional to $\lambda$. Using values of the oscillator strengths calculated with the above-referenced Cowan code, $f(13.650)=0.116$ and $f(13.139)=0.102$. Assuming statistical populations of the two lower levels, $N_2/N_1=2$. we find $R=2.4$. The opacities of the two lines thus do not differ significantly.

It has been determined by extensive analysis that a population inversion can be obtained by photoexciting $Mo^{6+}$ ions in a plasma having an electron density of less than $10^{18}$ cm$^{-3}$ with radiation from $Mo^{11+}$ ions in a plasma having an electron density greater than $10^{20}$ cm$^{-3}$. The resulting laser is of a wavelength less than about 1000 Angstroms, and more particularly of a wavelength of approximately 60 nm.

The apparatus for producing a laser in an $Mo^{6+}$ ion-containing plasma according to the present invention comprises means for generating an $Mo^{6+}$ ion-containing plasma and means for generating an $Mo^{11+}$ ion-containing plasma sufficiently near the $Mo^{6+}$ ion-containing plasma to allow line radiation from the $Mo^{11+}$ ion-containing plasma to photopump the $Mo^{6+}$ ions. Generally, the pumping line arises from a fairly high temperature plasma while the pumped line is provided from a colder plasma with the appropriate transitions as discussed above. Preferably, the apparatus according to the present invention comprises means for generating an $Mo^{6+}$ ion-containing plasma having an electron density less than about $10^{18}$ cm$^{-3}$ and means for generating an $Mo^{11+}$ ion-containing plasma having an electron density greater than about $10^{20}$ cm$^{-3}$ sufficiently near the $Mo^{6+}$ ion-containing plasma to allow line radiation from the $Mo^{11+}$ ion-containing plasma to photopump the $Mo^{6+}$ ions.

The two plasmas may be created in various manners. FIGS. 4 and 5 set forth schematic diagrams of two embodiments of the apparatus according to the present invention. In the embodiment of FIG. 4, the apparatus includes lasers 10 and 12 which are directed at a molybdenum target 14. Laser 10 produces a beam of approximately 1 μm radiation while laser 12 produces a beam of approximately 10 μm radiation. The 1 μm radiation is focused on a small area A of the molybdenum target and creates a high density ($N_e$ greater than about $10^{20}$ cm$^{-3}$) plasma with an appropriate temperature for a high abundance of Mo$^{11+}$ ions. The 10 μm radiation is focused into a line of plasma of lower electron density ($N_e$ of less than about $10^{18}$ cm$^{-3}$) and a lower temperature in which the population density of Mo$^{6+}$ ions is large. The two plasmas are in close proximity and the first plasma photopumps the second. A set of mirrors 16 coated with tungsten, multilayers or the like (30% reflectivity) serve as the laser cavity.

With respect to the embodiment of FIG. 5, the apparatus for producing a photopumped laser in an Mo$^{6+}$ ion-containing plasma comprises a low-inductance vacuum spark (Feldman et al, *Rev. Sci. Instrum.*, Vol. 38, No. 10, 1372 (1967)) with molybdenum electrodes. More particularly, the vacuum spark device 20 is provided with a spark trigger laser focused by a lens 22 and molybdenum electrodes 24. Under appropriate geometrical and electrical conditions, the two desired plasmas may be generated simultaneously. The inner, central plasma is relatively hot and dense and contains a high population of Mo$^{11+}$ ions while the outer, shell-like plasma is cooler and less dense and contains a high population of Mo$^{6+}$ ions. The plasmas have a duration of a significant portion of the discharge, that is, about $10^{-6}$ sec. As in the embodiment of FIG. 4, mirrors 26 coated with a heavy element such as tungsten and having a reflectivity of about 30%, are used to provide a resonant cavity for the lasing process. The Mo VII transitions in the outer shell are photopumped by the inner Mo XII radiation.

The apparatus shown schematically in FIGS. 4 and 5 are set forth to illustrate specific embodiments of the invention and are not intended to limit the scope of the methods and apparatus of the present invention. Additional embodiments and advantages within the scope of the claimed invention will be apparent to one of ordinary skill in the art.

What is claimed is:

1. A method for producing a laser in an Mo$^{6+}$ ion-containing plasma, comprising photopumping the Mo$^{6+}$ ions with radiation from Mo$^{11+}$ ions.

2. A method as defined by claim 1, wherein the laser is of a wavelength of approximately 60 nm.

3. A method as defined by claim 1, wherein the Mo$^{6+}$ ion-containing plasma has an electron density of less than about $10^{18}$ cm$^{-3}$ and the Mo$^{11+}$ ions are contained in a plasma having an electron density greater than about $10^{20}$ cm$^{-3}$.

4. A method as defined by claim 3, wherein the Mo$^{11+}$ ion-containing plasma is generated by focusing a first laser beam having a wavelength not greater than about 1 μm on a small area of a molybdenum target and wherein the Mo$^{6+}$ ion-containing plasma is generated by focusing a second laser beam having a wavelength of about 10 μm near the Mo$^{11+}$ plasma produced by the first laser.

5. A method as defined by claim 3, wherein the Mo$^{6+}$ ion-containing plasma and the ion-containing plasma are generated using a low-inductance vacuum spark with molybdenum electrodes.

6. A method as defined by claim 5, wherein the low-inductance vacuum spark generates an inner, central Mo$^{11+}$ ion-containing plasma and an outer, shell-like Mo$^{6+}$ ion-containing plasma.

7. An apparatus for producing a laser in an Mo$^{6+}$ ion-containing plasma, comprising means for generating an Mo$^{6+}$ ion-containing plasma and means for generating an Mo$^{11+}$ ion-containing plasma sufficiently near the Mo$^{6+}$ ion-containing plasma to allow radiation from the Mo$^{11+}$ ion-containing plasma to photopump the Mo$^{6+}$ ions.

8. An apparatus as defined by claim 7, wherein the laser is of a wavelength of approximately 60 nm.

9. An apparatus as defined by claim 7, comprising means for generating an Mo$^{6+}$ ion-containing plasma having an electron density less than about $10^{18}$ cm$^{-3}$ and means for generating an Mo$^{11+}$ ion-containing plasma having an electron density greater than about $10^{20}$ cm$^{-3}$ sufficiently near the Mo$^{6+}$ ion-containing plasma to allow radiation from the Mo$^{11+}$ ion-containing plasma to photopump the Mo$^{6+}$ ions.

10. An apparatus as defined by claim 9, wherein the means for generating the Mo$^{11+}$ ion-containing plasma comprises a first laser beam having a wavelength not greater than about 1 μm focused on a small area of a molybdenum target and the means for generating the Mo$^{6+}$ ion-containing plasma comprises a second laser beam having a wavelength of about 10 μm focused near the Mo$^{11+}$ plasma.

11. An apparatus as defined by claim 9, wherein the means for generating the Mo$^{6+}$ ion-containing plasma and the means for generating the Mo$^{11+}$ ion-containing plasma comprise a low-inductance vacuum spark with molybdenum electrodes.

12. An apparatus as defined by claim 11, wherein the low-inductance vacuum spark generates an inner, central Mo$^{11+}$ ion-containing plasma and an outer, shell like Mo$^{6+}$ ion-containing plasma.

* * * * *